United States Patent
Patel et al.

(10) Patent No.: US 11,114,936 B2
(45) Date of Patent: Sep. 7, 2021

(54) ADJUSTING OUTPUT VOLTAGE OF POWERED DEVICE PORTS

(71) Applicant: Hewlett Packard Enterprise Development LP, Houston, TX (US)

(72) Inventors: Deven Patel, Santa Clara, CA (US); Yu Liu, Santa Clara, CA (US); Sanh Huynh, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 733 days.

(21) Appl. No.: 15/699,457

(22) Filed: Sep. 8, 2017

(65) Prior Publication Data

US 2019/0081556 A1    Mar. 14, 2019

(51) Int. Cl.
*H02M 3/04* (2006.01)
*H04L 12/10* (2006.01)
*H04L 12/40* (2006.01)
*G06F 1/26* (2006.01)
*H02M 7/06* (2006.01)

(52) U.S. Cl.
CPC .............. *H02M 3/04* (2013.01); *G06F 1/266* (2013.01); *H02M 7/06* (2013.01); *H04L 12/10* (2013.01); *H04L 12/40045* (2013.01)

(58) Field of Classification Search
CPC ........... G06F 1/263; H02M 3/04; H02M 7/06; H04L 12/10; H04L 12/40045
USPC .......................................................... 307/24
See application file for complete search history.

(56) References Cited

U.S. PATENT DOCUMENTS

| 7,373,528 | B2 | 5/2008 | Schindler |
| 7,737,573 | B2 | 6/2010 | Phan et al. |
| 9,024,473 | B2 | 5/2015 | Huff et al. |
| 9,652,009 | B2 | 5/2017 | Wang |
| 2006/0019629 | A1* | 1/2006 | Berson .................. H04M 19/08 455/402 |
| 2006/0218415 | A1 | 9/2006 | Mak-Fan et al. |
| 2007/0284946 | A1 | 12/2007 | Robbins et al. |
| 2008/0100141 | A1* | 5/2008 | Lee .......... H02J 1/102 307/43 |
| 2008/0291039 | A1* | 11/2008 | Picard .................... G01R 31/58 340/652 |
| 2009/0079264 | A1 | 3/2009 | Minami |
| 2010/0007334 | A1* | 1/2010 | Apfel ...................... H04L 12/10 324/123 R |

(Continued)

FOREIGN PATENT DOCUMENTS

WO    2006/052217 A1    5/2006

OTHER PUBLICATIONS

Maxiipower, "PoE Power Combiner Cable", Vi0015, www.vigitron.com, Nov. 12, 2016, 3 pages.

(Continued)

*Primary Examiner* — Daniel Kessie
*Assistant Examiner* — Brian K Baxter
(74) *Attorney, Agent, or Firm* — Brooks, Cameron & Huebsch, PLLC

(57) ABSTRACT

An example system can determine a power consumption of each of a first and a second powered device ports, determine an output voltage demand of each of the first and the second powered device ports based on the determined power consumptions, and based on the output voltage demand, adjust an output voltage to each of the first and the second powered device ports via the power controller.

19 Claims, 4 Drawing Sheets

(56) References Cited

U.S. PATENT DOCUMENTS

| | | | |
|---|---|---|---|
| 2010/0037093 A1* | 2/2010 | Biederman | H04L 12/10 |
| | | | 714/14 |
| 2013/0339760 A1* | 12/2013 | Zimmerman | G06F 1/26 |
| | | | 713/300 |
| 2014/0084691 A1* | 3/2014 | Ranzato | H02J 1/00 |
| | | | 307/60 |
| 2015/0035365 A1* | 2/2015 | Picard | H04L 12/10 |
| | | | 307/39 |
| 2015/0127957 A1* | 5/2015 | Sethi | G06F 1/26 |
| | | | 713/300 |
| 2015/0205336 A1 | 7/2015 | Walker | |
| 2016/0291660 A1 | 10/2016 | Chueh et al. | |
| 2017/0222457 A1* | 8/2017 | Hijazi | G06F 1/263 |
| 2017/0229857 A1* | 8/2017 | Kral | H02J 3/386 |
| 2018/0090984 A1* | 3/2018 | Ku | H02M 3/04 |
| 2018/0131182 A1* | 5/2018 | Vavilala | H04L 12/10 |
| 2018/0176026 A1* | 6/2018 | Yseboodt | G05F 3/02 |
| 2019/0097452 A1* | 3/2019 | Mori | H02J 3/38 |
| 2019/0199536 A1* | 6/2019 | Kurk | H04L 12/10 |

OTHER PUBLICATIONS

European Search Report and Search Opinion Received for EP Application No. 17198656.5, dated Feb. 9, 2018, 8 pages.

* cited by examiner

ADJUSTING OUTPUT VOLTAGE OF POWERED DEVICE PORTS

BACKGROUND

An access point (AP), can be a networking hardware device that allows a wireless device to connect to a wired network. An AP can include ports, such as powered device (PD) or Power over Ethernet (PoE) ports for power allocation. PoE ports can allow for network cables to carry electrical power.

DETAILED DESCRIPTION

Devices such as APs can include integrated circuits with ports for connection to devices and/or applications, among others. In some examples, the PD ports may facilitate physical connectors, such as cables. Such PD ports may have a threshold amount of output voltage allowed through the ports. For instance, a PD port may have a limit of 25.4 watts per port under an IEEE 802.11 at specification. Such an example may be a PoE port. As used herein, PoE may include a system that allows network cables to carry electrical power. For instance, PoE may allow a single cable to provide both data connection and electric power to powered devices, such as wireless APs, internet protocol cameras, and VoIP phones, among others.

As the number of features available to APs increases, so may a demand for power allocation. However, because PD ports of an AP may have threshold allowed output voltage amounts, an AP may not be able to take advantage of available features due to an insufficient amount of power.

Some approaches to increasing output voltage or power include setting a threshold current limit for a first power sourcing equipment (PSE) and using the first PSE for all power until the threshold is reached, at which time its duty cycle is limited. A second PSE may be used once the threshold current is met by the first PSE.

Examples of the present disclosure can combine existing PD ports to achieve increased power allocation. For example, power can be combined from two PD ports by dynamically reducing voltage of a first PD port when it reaches a particular threshold, and a second PD port can continue to supply additional power as needed. For instance, combining two PD ports in accordance with the present disclosure may double an output voltage or power, allowing for the use of more and/or new features for APs.

As used herein, the term "access point" (AP) can, for example, refer to receiving points for any known or convenient wireless access technology which may later become known. Specifically, the term AP is not intended to be limited to IEEE 802.11-based APs. APs may function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 WLAN interfaces, although examples of the disclosure are not limited to such interfaces. An AP can include a memory resource, including read-write memory, and a hierarchy of persistent memory such as ROM, EPROM, and Flash memory. While APs are discussed herein, examples of the disclosure are not limited to APs. Other PDs housing PD ports may be used.

Figure 1:
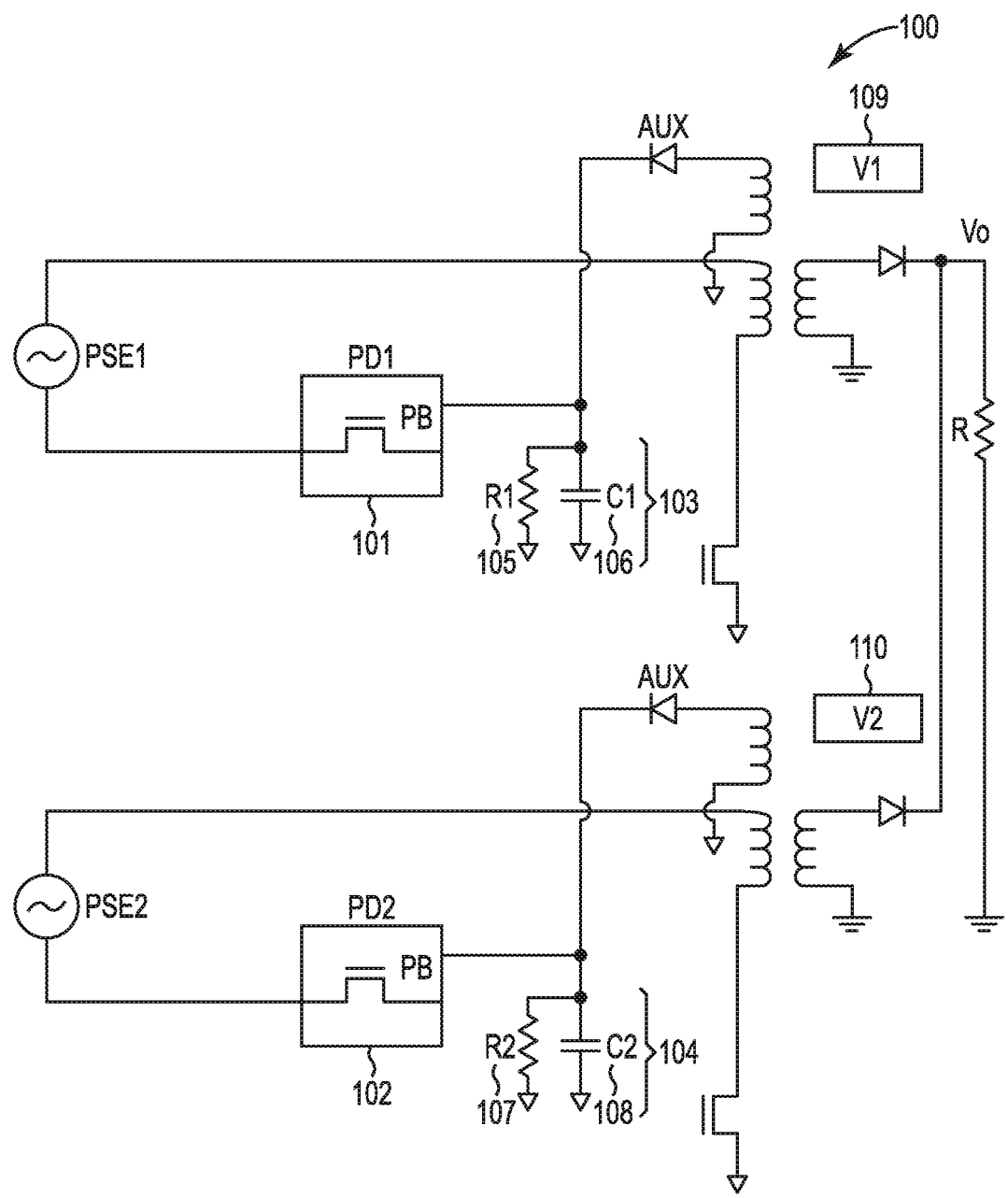
FIG. 1 illustrates a diagram of a system including a first PD port and a second PD port.

FIG. 1 illustrates a diagram of a system 100 including a first PD port 101 and a second PD port 102. The first PD port 101 and the second PD port 102 can be PoE ports within an AP. While two PD ports are illustrated in FIG. 1, more PD ports may be used in examples of the present disclosure.

In the example illustrated in FIG. 1, each of the first PD port 101 and the second PD port 102 can allow for an output voltage to droop automatically as a load on the first PD port 101 or the second PD port 102 increases. In some examples where the first PD port 101 has a higher output voltage V1 109 as compared to an output voltage V2 110 of the second PD port 102, as load continues to increase at the first PD port 101, the higher output voltage V1 109 can droop to approximately match the output voltage V2 110. As used herein, "automatically" can include being performed with limited or no user input and/or with limited or no prompting. "Approximately," as used herein, can include a value within a particular margin, range, and/or threshold. In such examples, any further load increase can draw current from both the first PD port 101 and the second PD port 102, achieving current sharing. Put another way, current can be drawn from both the first PD port 101 and the second PD port 102 during a subsequent load increase.

For instance, a first power load can be received at the first PD port 101, and a second power load can be received at the second PD port 102. In some examples, in response to the first power load increasing, an output voltage associated with the first PD port 101 can be automatically drooped to approximately match an output voltage associated with the second PD port 102 using a droop circuit 103 communicatively coupled to the first PD port 101. Circuit 103, referred herein after to as "droop circuit 103," can adjust a droop rate associated with a PD port. In some examples, automatically drooping the output voltages associated with the first PD port 101 can be performed in response to the first PD port 101 reaching a threshold voltage level. As used herein, "communicatively coupled" can include coupled via various wired and/or wireless connections between devices such that data can be transferred in various directions between the devices. The coupling need not be a direct connection, and in some examples can be an indirection connection.

Droop circuit 103 can include a resistor R1 105 and a capacitor C1 106, and a different droop circuit 104 communicatively coupled to the second PD port 102 can include a resistor R2 107 and a capacitor C2 108. A rate of automatic drooping via droop circuit 103 can be adjusted by adjusting resistor R1 105 and/or capacitor C1 106, and a rate of automatic drooping via droop circuit 104 can be adjusted by adjusting resistor R2 107 and/or capacitor C2 108. For instance, resistors R1 105, R2 107 and/or capacitors C1 106, C2 108 can be fine-tuned to reach a desired slope for voltage droops. In some examples, a smaller resistor-capacitor (RC) constant associated with droop circuits 103 and/or 104 can result in a faster droop, which may indicated approximately 50/50 current sharing. A larger RC constant associated with droop circuits 103 and/or 104 can result in a longer time period for a higher voltage PD port (e.g., the first PD port PD1 101 in this example) to droop, resulting in a higher load addressed by the higher voltage PD port until each desired output voltage is achieved. This adjustability can be referred to as an adjustable share point.

In some examples, the output voltage associated with the first PD port 101 can be combined with the output voltage associated with the second PD port 102. As used herein, "output voltage" can include an output power. For instance, more power may be desired than can be provided from a single PD port. By combining the output voltage associated with the first PD port 101 with the output voltage associated with the second PD port 102, a desired power amount can be met. Put another way, the output voltage combination can power a single device, such as an AP, that may demand more power than can be provided by a single PD port. In some examples, output power can be combined when output voltages of different PD ports are drooped higher, lower, or equal to one another to provide equal sharing of a load.

For instance, if each PD port 101, 102 is able to supply 25 Watts of power, but an application can use 35 Watts, PD ports 101 and 102 can share the load of the application, with each supplying 17.5 Watts, or some other combination to reach 35 Watts. In another example, if PD port 101 is at 12 volts and PD port 102 is at 11.5 volts, the output voltage of PD port 101 can be drooped from 12 volts to 11.5 volts to provide equal sharing of the load.

Figure 2:
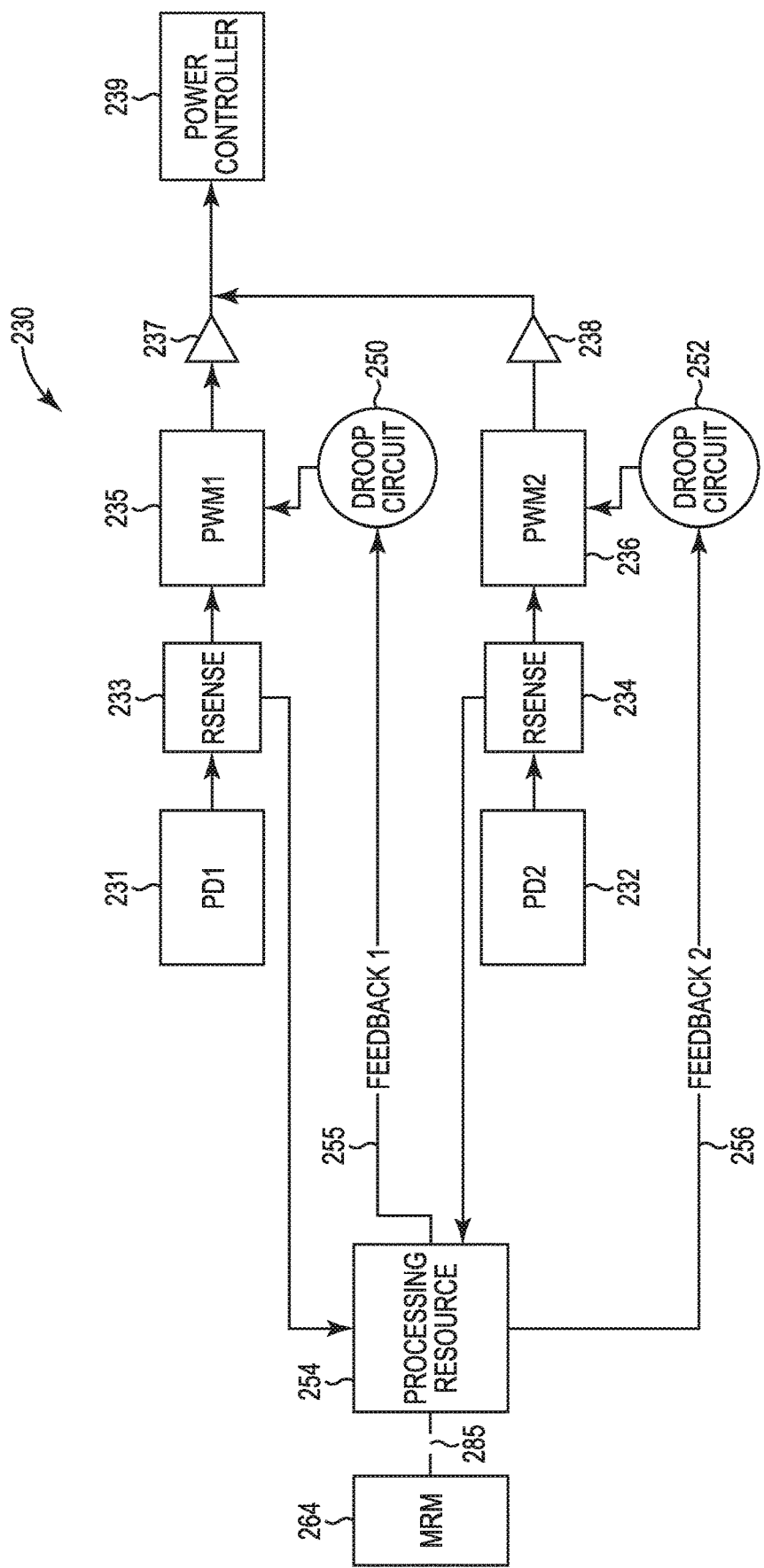
FIG. 2 illustrates a diagram of a system including a first PD port, a second PD port, and a power controller.

FIG. 2 illustrates a diagram of a system 230 including at least a first PD port 231, a second PD port 232 and a power controller 239. In some instances, system 230 can include an AP. System 230 can include a first PD port 231 and a second PD port 232 communicatively coupled to a power controller 239. In some instances, power controller 239 can be a direct current (DC)-to-DC converter and/or first PD port 231 and second PD port 232 can be PoE ports.

System 230 can include a first sensor 233 communicatively coupled to first PD device port 231 and a second sensor 234 communicatively coupled to second PD device port 232. In the example illustrated in FIG. 2, voltage droop can be controlled using executable instructions, as will be discussed further herein. Artificial current sharing and port priority can be achieved, in some instances, by connecting a feedback pin of power controller 239, output voltage can be artificially adjusted to achieved current sharing and a desired load percentage.

Port prioritization can include determining which PD port to prioritize with a higher output voltage by reading a power consumption of each PD port. In response, voltage can be adjusted to prioritize whichever PD port is desired to supply more power. For example, first sensor 233 can sense a current of first PD port 231 and modulate via first pulse-width modulator 235 and first droop circuit 250 a first feedback voltage via feedback path 255 to the first PD port 231. Similarly, second sensor 234 can sense a current of second PD port 232 and modulate via second pulse-width modulator 236 and droop circuit 252 a second feedback voltage via feedback path 256 to second PD device 232. In some examples, first droop circuit 250 can communicate with second droop circuit 252 to determine feedback modulation for output voltages of first PD port 231 and second PD port 232. Put another way, the first droop circuit 250 can be communicatively coupled to the second droop circuit 252 to determine feedback modulation for output voltages associated with the first PD port 231 and the second PD port 232.

System 230 can include a non-transitory machine readable medium (MRM) 264 communicatively coupled to the first PD port 231 and the second PD port 232 via processing resource 254. MRM 264 can be a memory resource and can be in communication with a processing resource 254. MRM 264, as used herein, can include memory components capable of storing instructions that can be executed by processing resource 254. MRM 264 can be integrated in a single device or distributed across multiple devices. Further, MRM 264 can be fully or partially integrated in the same device as processing resource 254 or it can be separate but accessible to that device and processing resource 254.

MRM 264 can be in communication with the processing resource 254 via a communication link (e.g., a path) 285. The communication link 285 can be local or remote to a machine (e.g., a computing system) associated with the processing resource 254. Examples of a local communication link 285 can include an electronic bus internal to a machine (e.g., a computing system) where MRM 264 is one of volatile, non-volatile, fixed, and/or removable storage medium in communication with the processing resource 254 via the electronic bus.

MRM 264 can include instructions executable to share output voltages between the first PD port 231 and the second PD port 232. For instance, the instructions, in some examples, can be executable by processing resource 254 (e.g., a central processing unit (CPU)) to determine a power consumption of each of the first 231 and the second 232 PD ports, determine an output voltage demand of each of the first 231 and the second 232 PD ports based on the determined power consumptions, and based on the output voltage demand, adjust an output voltage to each of the first 231 and the second 232 PD ports via the power controller 239. Adjusting the voltage, in some examples, can include prioritizing which of the first PD port 231 or the second PD port 232 supplies more power. The output voltages of PD port 231 and PD port 232 can be combined subsequent to passing through diodes 237 and 238 respectively, and a device, application, etc. can be powered with the combined output voltages.

For instance, if first PD port 231 can supply 15 Watts of power, and second PD port 232 can supply 25 Watts of power, but a desired application can use 35 Watts, first PD port 231 and second PD port 232 can share the load of the application, with first PD port 231 supplying 15 Watts and second PD port 232 supplying 20 Watts, or some other combination to reach 35 Watts where power supplied by first PD port 231 does not exceed 15 Watts. In such an example, first sensor 233 can sense first PD port 231 can supply 15 Watts, while second sensor 234 can sense second PD port 232 can supply up to 25 Watts.

Figure 3:
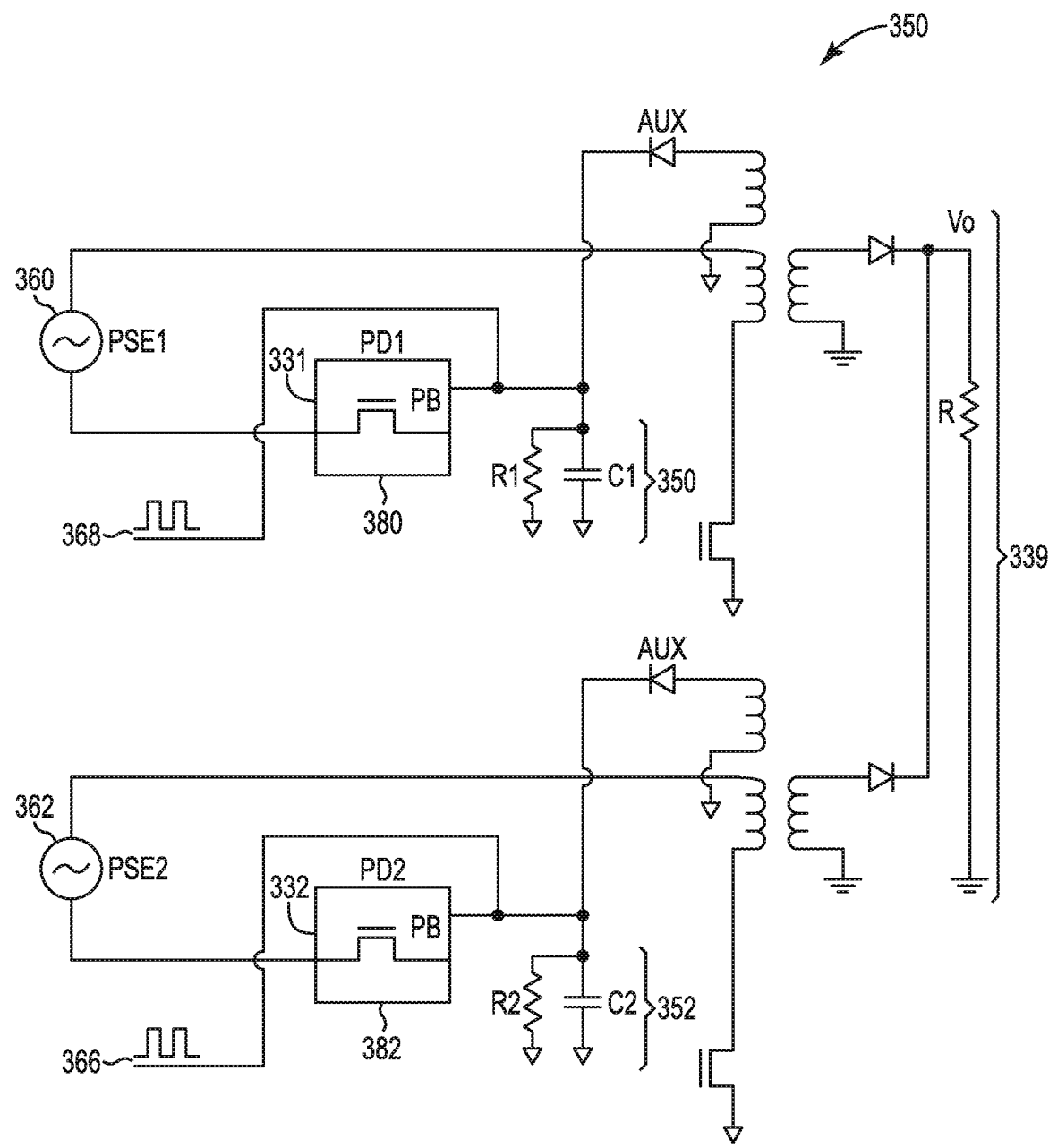
FIG. 3 illustrates another diagram of a system including a first PD port and a second PD port.

FIG. 3 illustrates another diagram of a system 350 including a first PD port 331 and a second PD port 332. In some instances, system 350 can include an MRM in communication with a processing resource similar to FIG. 2. For instance, a first MRM 368 can be communicatively coupled to first PD port 331 and a second MRM 366 can be communicatively coupled to second PD port 332. While two MRMs are illustrated in FIG. 3, more or fewer MRMs (and associated processing resource) may be present in system 350.

System 350 can include an AP, and in some examples, system 350 can include a first power sourcing equipment (PSE) device 360 associated with first PD port 331 and having a different power capacity than second PSE device 362 associated with second PD port 332. As used herein, power capacity can include an amount of power supportable by the PSE device. For instance, example power capacities can include 25.4 Watts and 12.9 Watts, among others. In some instances, the first PSE device 360 has a different power classification than the second PSE device 362. As used herein, power classification can include a designation associated with a PSE device based on its power capacity. For instance, a class 1 PSE device may have a lower power capacity as compared to a class 2 PSE device. Certain PSE devices can have a plurality of classifications. For instance, PDs can include up to nine class power levels, in some examples.

System 350 can include a first PD port controller 380 communicatively coupled to the first PD port 331 to monitor a power load on the first PD port 331. System 350 can also include a second PD port controller 382 communicatively coupled to the second PD port 332 to monitor a power load on the second PD port 332. A droop circuit 350 communicatively coupled to the first PD port 331 can droop an output voltage of the first PD port 331 to approximately the same output voltage of the second PD port 332. In some examples, system 350 can include a load 339 communicatively coupled to the first 331 and the second 332 PD ports. The load 339 can communicate with the first PD port 331 and the second PD port 332 to adjust an output voltage. The output voltages of the first 331 and the second 332 PD ports can be combined and subsequently adjusted in response to a change to a load (e.g., load 339) of system 350.

In some examples, the output voltages of the first PD port 331 and the second PD port 332 can be adjusted based on feedback voltage associated with each of the first and the second PD ports 331, 332 and/or based on communication between the droop circuit 350 and a different droop circuit 352 communicatively coupled to the second PD port 332. For instance, artificial sharing and port priority can be achieved by communicatively coupling load 339 to first 331 and second 332 PD ports.

In some examples, port prioritization and/or balancing can extend the life of hardware components by utilizing each PD port approximately equally. For instance, wear and tear can be reduced because circuitry may be run at a reduced capacity or for a reduced amount of time as compared to systems without port prioritization or sharing. For instance, a first PD port 331 can be prioritized as a high-priority source of output voltage for a predetermined amount of time (e.g., 6 months), such that the PD port 331 can be used more often and/or provide more power than a second PD port 332. Upon reaching the end of the predetermined amount of time, the second PD port 332 can be prioritized as the high-priority source.

Figure 4:
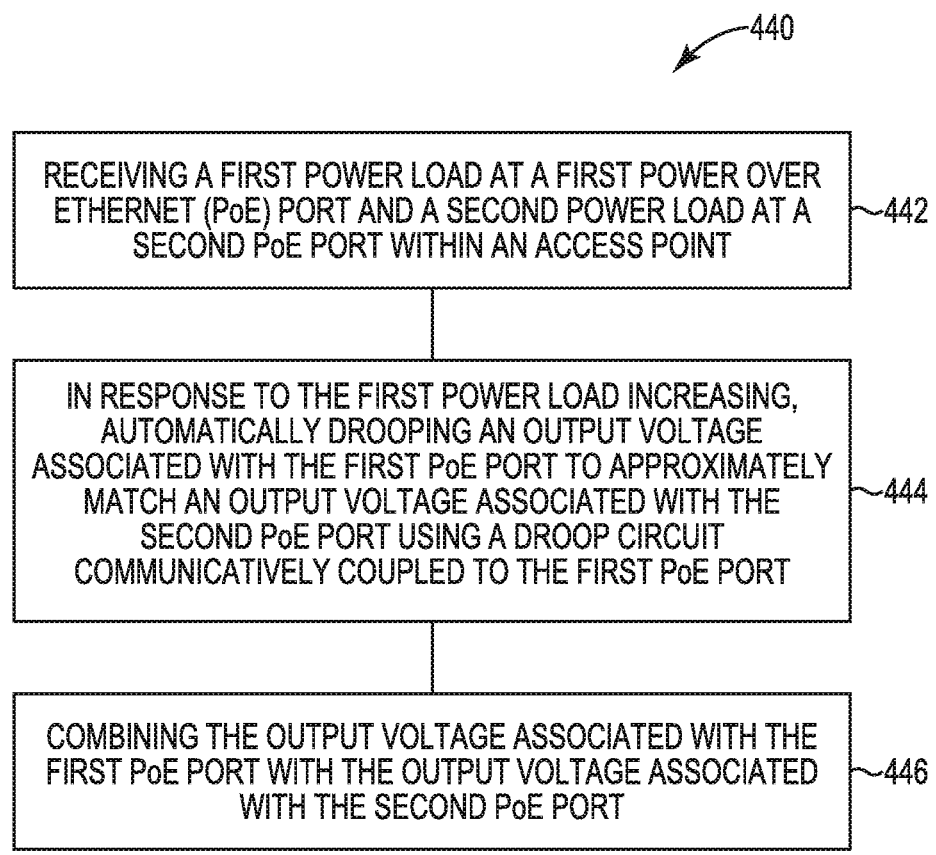
FIG. 4 illustrates a diagram of a method associated with output voltage combination according to an example.

FIG. 4 illustrates a diagram of a method 440 associated with output voltage combination according to an example. At 442, method 440 can include receiving a first power load at a first PoE port and a second power load at a second PoE port within an access point. At 444, method 440 can include automatically drooping an output voltage associated with the first PoE port to approximately match an output voltage associated with the second PoE port using a droop circuit communicatively coupled to the first PoE port in response to the first power load increasing. In some instances, method 440 can include automatically drooping the output voltage associated with the first PoE port in response to the first PoE port reaching a threshold output voltage level. For instance, when the output voltage level of the first PoE port reaches a predetermined amount, the second PD port can supply the additional power to run an associated device, application, etc.

In some examples, method 440 can include adjusting a rate of the automatic drooping by adjusting at least one of a resistor and a capacitor within the droop circuit. This can be referred to as an adjustable share point, and can include adjusting an RC constant for a desired slope for voltage droop.

Method 440, at 446 can include combining the output voltage associated with the first PoE port with the output voltage associated with the second PoE port, and in some examples, method 440 can include drawing current from both the first PoE port and the second PoE port during a subsequent load increase. For instance, a desired output voltage for an associated device, application, etc. can be reached by combining the output voltages, and during subsequent load increase, because a current load may be balanced, current can be draw from both the first PoE port and the second PoE port.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. For example, "231" may reference element "31" in FIG. 2, and a similar element may be referenced as 331 in FIG. 3. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed:

1. A system, comprising:
 a first powered device port communicatively coupled to a power controller;
 a second powered device port communicatively coupled to the power controller, wherein a first power sourcing equipment (PSE) device associated with the first powered device port has a different power classification than a second PSE device associated with the second powered device port; and
 a non-transitory machine readable medium communicatively coupled to the first and the second powered device ports and comprising instructions to share output voltages between the first powered device port and the second powered device port, wherein the instructions are executable by a processing resource to:
  determine a power consumption of each of the first and the second powered device ports;
  determine an output voltage demand of each of the first and the second powered device ports based on the determined power consumptions; and
  based on the output voltage demand, prioritize which of the first or the second powered device ports supplies more power and adjust an output voltage to each of the first and the second powered device ports via the power controller to a nonzero value.

2. The system of claim 1, wherein the power controller comprises a direct current (DC)-to-DC converter.

3. The system of claim 1, wherein the instructions executable to adjust the output voltage comprise instructions executable to prioritize the first powered device port over the second powered device port for a predetermined amount of time.

4. The system of claim 1, wherein a first power sourcing equipment (PSE) device associated with the first powered device port has a different power capacity than a second PSE device associated with the second powered device port.

5. The system of claim 1, wherein:
a power classification of the first PSE device comprises a designation based on a power capacity of the first PSE device; and
a power classification associated with the second PSE device comprises a designation based on a power capacity of the second PSE device.

6. The system of claim 1, further comprising:
a first sensor communicatively coupled to the first powered device port to:
sense a current of the first powered device port; and
modulate a first feedback voltage to the first powered device port; and
a second sensor communicatively coupled to the second powered device port to:
sense a current of the second powered device port; and
modulate a second feedback voltage to the second powered device port.

7. The system of claim 1, wherein the system comprises an access point.

8. The system of claim 1, wherein the first and the second powered device ports comprise power over Ethernet (PoE) ports.

9. A system, comprising:
a first powered device port with a first output voltage communicatively coupled to first powered device port controller to determine and monitor a power load on the first powered device port;
a second powered device port with a second output voltage lower than the first output voltage and communicatively coupled to a second powered device port controller to determine a power load on the second powered device port, wherein a first power sourcing equipment (PSE) device associated with the first powered device port has a different power classification than a second PSE device associated with the second powered device port;
a droop circuit communicatively coupled to the first powered device port to droop an output voltage of the first powered device port to approximately a same output voltage of the second powered device port; and
a controller communicatively coupled to the first and the second powered device ports to:
combine the drooped output voltage of the first powered device port and the output voltage of the second powered device port;
prioritize which of the first or the second powered device ports supplies more power; and
subsequently adjust the output voltages of the first powered device port and the second powered device port to a nonzero value in response to a change to a load of the system.

10. The system of claim 9, wherein the controller adjusts the output voltages of the first powered device port and the second powered device port based on feedback voltage associated with each of the first powered device port and the second powered device port.

11. The system of claim 9, wherein the controller adjusts the output voltages of the first powered device port and the second powered device port based on communication between the droop circuit and a different droop circuit communicatively coupled to the second powered device port.

12. The system of claim 9, wherein the first droop circuit is communicatively coupled to a different droop circuit to determine feedback modulation for output voltages associated with the first powered device port and the second powered device port.

13. A method, comprising:
receiving a first power load at a first power over Ethernet (PoE) port and a second power load at a second PoE port within an access point;
prioritizing which of the first or the second PoE ports supplies more power;
in response to the first power load increasing, automatically drooping an output voltage associated with the first PoE port to approximately match an output voltage associated with the second PoE port using a droop circuit communicatively coupled to the first PoE port; and
combining the drooped output voltage associated with the first PoE port with the output voltage associated with the second PoE port, wherein a first power sourcing equipment (PSE) device associated with the first POE port has a different power classification than a second PSE device associated with the second PoE port, the dropped output voltage associated with the first PoE port and the output voltage associated with the second PoE port being nonzero.

14. The method of claim 13, further comprising drawing current from both the first PoE port and the second PoE port during a subsequent load increase.

15. The method of claim 13, further comprising adjusting a rate of the automatic drooping by adjusting at least one of a resistor and a capacitor within the droop circuit.

16. The method of claim 13, wherein the drooping of the output voltage associated with the first PoE port is in response to the first PoE port reaching a threshold output voltage level.

17. The method of claim 13, wherein the prioritizing comprises prioritizing the first PoE port over the second PoE port for a predetermined amount of time.

18. The method of claim 13, wherein automatically drooping the output voltage associated with the first PoE port comprises drooping the output voltage associated with the first PoE port without user input and without user prompting.

19. The system of claim 9, wherein the droop circuit adjusts a rate of the automatic drooping based on a resistance of a resistor and a capacitance of a capacitance within the droop circuit.

* * * * *